US008863914B2

United States Patent
Herges et al.

(10) Patent No.: US 8,863,914 B2
(45) Date of Patent: Oct. 21, 2014

(54) SELF-ENERGIZING DISK BRAKE WITH WEDGE ELEMENTS

(75) Inventors: Michael Herges, Munich (DE); Bernhard Miller, Weil der Stadt (DE); Markus Stoehr, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 1713 days.

(21) Appl. No.: 12/161,327

(22) PCT Filed: Jan. 18, 2007

(86) PCT No.: PCT/EP2007/000411
§ 371 (c)(1),
(2), (4) Date: Dec. 29, 2010

(87) PCT Pub. No.: WO2007/082744
PCT Pub. Date: Jul. 26, 2007

(65) Prior Publication Data
US 2011/0083927 A1    Apr. 14, 2011

(30) Foreign Application Priority Data
Jan. 18, 2006  (DE) .......................... 10 2006 002 308

(51) Int. Cl.
| F16D 55/02 | (2006.01) |
| B60T 13/74 | (2006.01) |
| F16D 65/18 | (2006.01) |
| F16D 121/14 | (2012.01) |
| F16D 121/24 | (2012.01) |
| F16D 125/40 | (2012.01) |
| F16D 125/24 | (2012.01) |
| F16D 125/26 | (2012.01) |
| F16D 127/10 | (2012.01) |

(52) U.S. Cl.
CPC ............ *F16D 65/18* (2013.01); *F16D 2121/14* (2013.01); *F16D 2121/24* (2013.01); *F16D 2125/40* (2013.01); *F16D 2125/24* (2013.01); *F16D 2125/26* (2013.01); *F16D 2127/10* (2013.01); *B60T 2270/83* (2013.01)
USPC ....... 188/72.2; 188/70 B; 188/72.6; 188/72.7; 188/73.1; 188/156

(58) Field of Classification Search
USPC ........... 188/72.2, 72.5, 72.7, 71.9, 71.8, 72.8, 188/71.7, 71.1, 72.1, 72.6, 151 R, 70 B, 156, 188/157, 324, 343; 303/122, 191
See application file for complete search history.

(56) References Cited

U.S. PATENT DOCUMENTS

| 2,471,865 A | 5/1949 | Dieckmann |
| 3,425,519 A * | 2/1969 | Heinz .......................... 188/72.3 |

(Continued)

FOREIGN PATENT DOCUMENTS

| DE | 1 425 236 | 10/1968 |
| DE | 1 291 951 | 4/1969 |

(Continued)

OTHER PUBLICATIONS

International Search Report dated Apr. 13, 2007 including English translation (Six (6) pages).

*Primary Examiner* — Anna Momper
*Assistant Examiner* — San Aung
(74) *Attorney, Agent, or Firm* — Crowell & Moring LLP (57) ABSTRACT

A part-lining disk brake is described, having an electromechanical actuator, a self-energizing application device with a wedge arrangement designed to press a brake lining against a disk brake, and at least two wedge elements of the wedge arrangement moveable relative to one another, arranged on one of a brake caliper frame and an auxiliary frame. The wedge elements are used to apply the brake lining, and act on the brake lining via a trapezoidal pressure plate.

22 Claims, 8 Drawing Sheets

(56) References Cited

U.S. PATENT DOCUMENTS

| | | | | |
|---|---|---|---|---|
| 3,662,864 A | * | 5/1972 | Evans | 188/72.2 |
| 4,457,408 A | * | 7/1984 | Montalvo, III | 188/72.2 |
| 5,096,020 A | * | 3/1992 | Korhonen | 187/376 |
| 6,978,868 B2 | | 12/2005 | Schautt | |
| 2004/0154881 A1 | | 8/2004 | Baumann et al. | |
| 2005/0127749 A1 | * | 6/2005 | Hartmann et al. | 303/122 |
| 2005/0167212 A1 | | 8/2005 | Pascucci et al. | |
| 2008/0128218 A1 | * | 6/2008 | Gremaud et al. | 187/250 |

FOREIGN PATENT DOCUMENTS

| | | | | |
|---|---|---|---|---|
| DE | 1 301 942 | | 8/1969 | |
| DE | 196 05 988 A1 | | 8/1997 | |
| DE | 100 56 451 A1 | | 5/2002 | |
| DE | 101 56 348 C1 | | 4/2003 | |
| DE | 103 35 402 A1 | | 2/2005 | |
| EP | 141409 A1 | * | 5/1985 | F16D 65/54 |
| FR | 1.380.194 | | 11/1964 | |
| WO | WO 210609 A1 | * | 2/2002 | F16D 65/095 |
| WO | WO 0210609 A1 | * | 2/2002 | F16D 65/095 |

\* cited by examiner

Fig. 16

SELF-ENERGIZING DISK BRAKE WITH WEDGE ELEMENTS

BACKGROUND AND SUMMARY OF THE INVENTION

The invention relates to a disk brake, in particular a part-lining disk brake, having an electromechanical actuator and an application device of self-energizing type, which has a wedge arrangement designed to press a brake lining against a disk brake.

A self-energizing disk brake with a wedge arrangement is disclosed by German patent document DE 1 291 951, for example. This document describes a hydraulically actuated part-lining disk brake having a brake caliper or frame gripping around the brake disk, and an application device, actuated by a Bowden cable independently of the hydraulic actuation device, for application as a parking brake.

Wedge-shaped plates, which can be displaced against one another with their wedge faces bearing against one another, are arranged between the brake piston and the brake shoe or the brake lining, the plate facing the brake piston being braced against the brake cylinder or the brake caliper/frame. The plate acted upon by the brake piston in this example has pyramidal shape, preferably that of a truncated pyramid, counter-sliding wedges interacting with one pair of inclined faces for the mechanical brake actuation and counter-sliding wedges interacting with the other pair of inclined faces for adjustment of the brake clearance.

A disadvantage to this disk brake is the poor adjustability. It is therefore advisable to use an electric motor as actuator, which has the advantage of a good facility for adjustment and control. The adjustment can be computed in widely varying ways, where necessary incorporating a braking sensor or default variables.

Such an arrangement would still have the disadvantage, however, that it would have a relatively complicated construction. The embodiments of the invention eliminate this problem.

According to the invention, a disk brake is provided, in particular a part-lining disk brake, having an electromechanical actuator and an application device of self-energizing type, which as self-energizing device has a wedge arrangement designed to press a brake lining against a disk brake. At least two wedge elements moveable relative to one another are arranged on a brake caliper or frame or on an auxiliary frame for applying the application-side [brake lining], the elements being designed to act on the brake lining via a trapezoidal pressure plate, such as a wedge plate.

In an especially preferred embodiment of this arrangement, a unit which includes the wedge elements and the brake lining unit bearing against the brake disk can, during braking sequences, be moved together on the brake caliper or on the auxiliary frame parallel to the brake disk friction face against stops, against which it is braced during braking sequences.

Such bracing of the application forces against the brake caliper can advantageously be achieved, in this exemplary embodiment, without placing any stress on the actuator. The arrangement is suitable for braking both in a forward and in a reverse direction and in particular also for applications of a parking brake, even on ferries, where the inclination of the vehicle may change continuously. The brake moreover has a fundamentally simple design construction.

Other objects, advantages and novel features of the present invention will become apparent from the following detailed description of the invention when considered in conjunction with the accompanying drawing.

BRIEF DESCRIPTION OF THE DRAWINGS

The invention will be described in more detail with reference to the drawings and on the basis of exemplary embodiments, illustrating the working in detail and describing further advantages of the invention. In the drawings.

DETAILED DESCRIPTION OF THE DRAWINGS

Figure 1A:
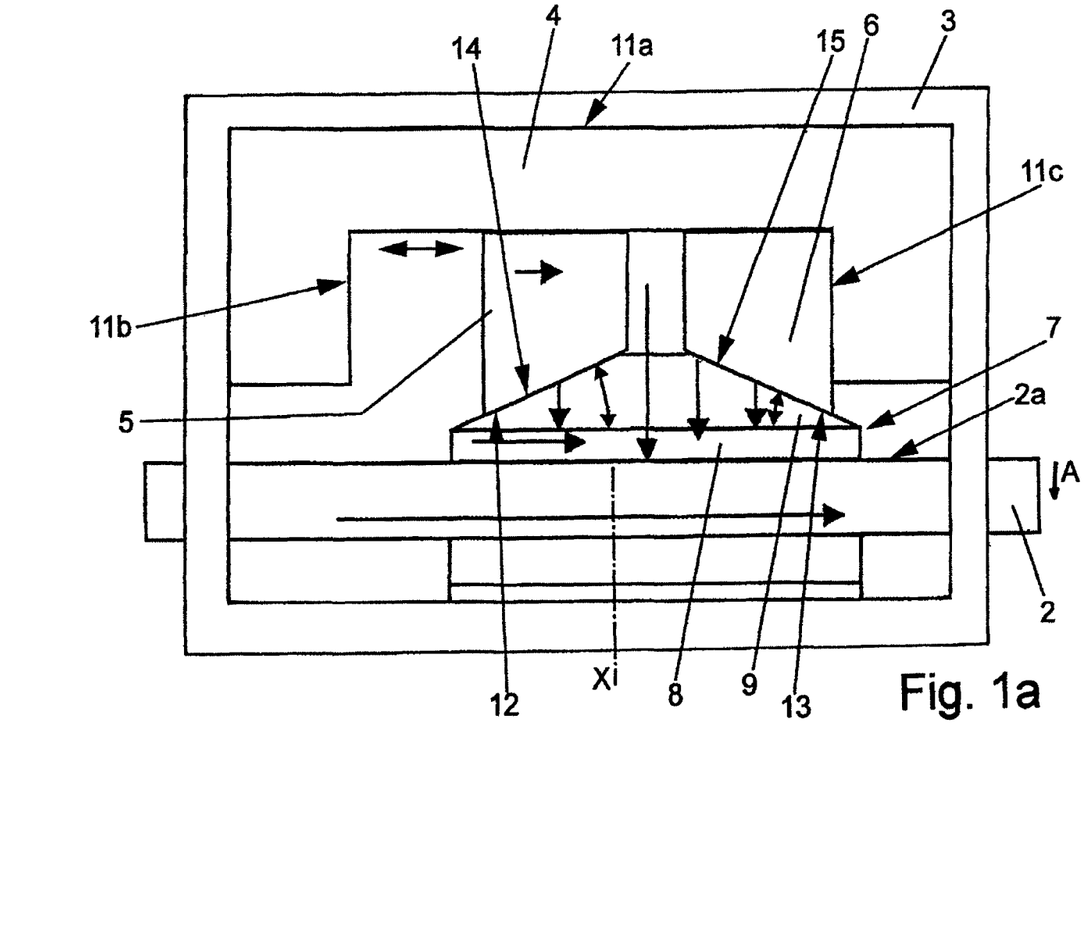
FIG. 1a shows a sectional sketch drawing of a first exemplary embodiment of a disk brake according to the invention, giving a simplified representation of the application device and omitting the drive in the form of an electric motor.

FIG. 1 shows a schematic drawing of a disk brake 1 having a brake frame 3 enclosing a brake disk 2 in the upper peripheral edge. Two wedge elements 5, 6 are arranged inside an auxiliary frame 4, which is fixed in the brake caliper and which may also be a part of the brake caliper or frame 3. These wedge elements 5, 6 are moveable, in particular displaceably guided, on the auxiliary frame 4 in a peripheral direction and parallel to the brake disk 1. This facility for displacement may be achieved by various designs, for example by using roller or slide bearings and where necessary suitable guidance between the wedge elements 5, 6 and the auxiliary frame 4.

A brake lining unit 7, which is formed from a brake lining 8 and a pressure plate 9 arranged between the brake lining 8 and the wedge faces, is arranged between the two wedge elements 5, 6 and an application-side brake disk friction surface 2a. The brake lining 8 has a backing plate and a lining material (not shown here). The pressure plate 9 and the backing plate may also be integrally formed.

On the reaction side a reaction-side brake lining 10 is arranged between the brake frame and the brake disk 2. The brake caliper may be an immovable, fixed caliper, so that the brake disk is designed to move in an axial direction A. Floating and hinged caliper designs are also alternatively feasible. At least the application-side brake lining unit is arranged on the brake caliper so that it is moveable relative to the brake disk 1, both parallel to the brake disk axis of rotation X and parallel to the brake disk friction surface.

The exemplary auxiliary frame has a U-shape and is provided with a base member 11a, which extends parallel to the brake disk friction surface 2a. It is bounded at both ends by longitudinal members 11b, 11c, which extend from the base member 7 in the direction of the brake disk and which serve as stops for the wedge elements 5, 6 in their movements in a peripheral direction (according to the direction of rotation of the brake disk). In this way a stop for each of the wedge elements 5, 6 is achieved in both directions of rotation U1, U2.

In the top view in FIG. 1 the pressure plate 9 has a trapezoidal shape with two wedge faces 12, 13 inclined towards one another, which bear against the wedge faces 14, 15 of the wedge elements 5, 6, likewise inclined towards one another.

In section and in the top view shown in FIG. 1, the pressure plate or wedge plate 9 acting on the brake lining has the geometry of an isosceles trapezoid, the base of which faces the brake lining. The geometry of an isosceles trapezoid leads to the same braking action in both directions of rotation of the disk (forward or reverse travel). The geometry of a scalene trapezium may also be used in a different embodiment, in order to achieve different braking characteristics in the two directions of rotation.

The movement of the wedge face elements 5, 6 relative to one another may be accomplished in any known manner. It is in a preferred embodiment achieved by a spindle 16, which is provided with a corresponding external thread and which engages in corresponding tapped holes 17, 18 having an internal thread in the wedge elements, the wedge elements 5, 6 being moved towards one another in the one direction of rotation of the electric motor-driven spindle 16 and away from one another in the other direction of rotation of the spindle 16.

Figure 2:
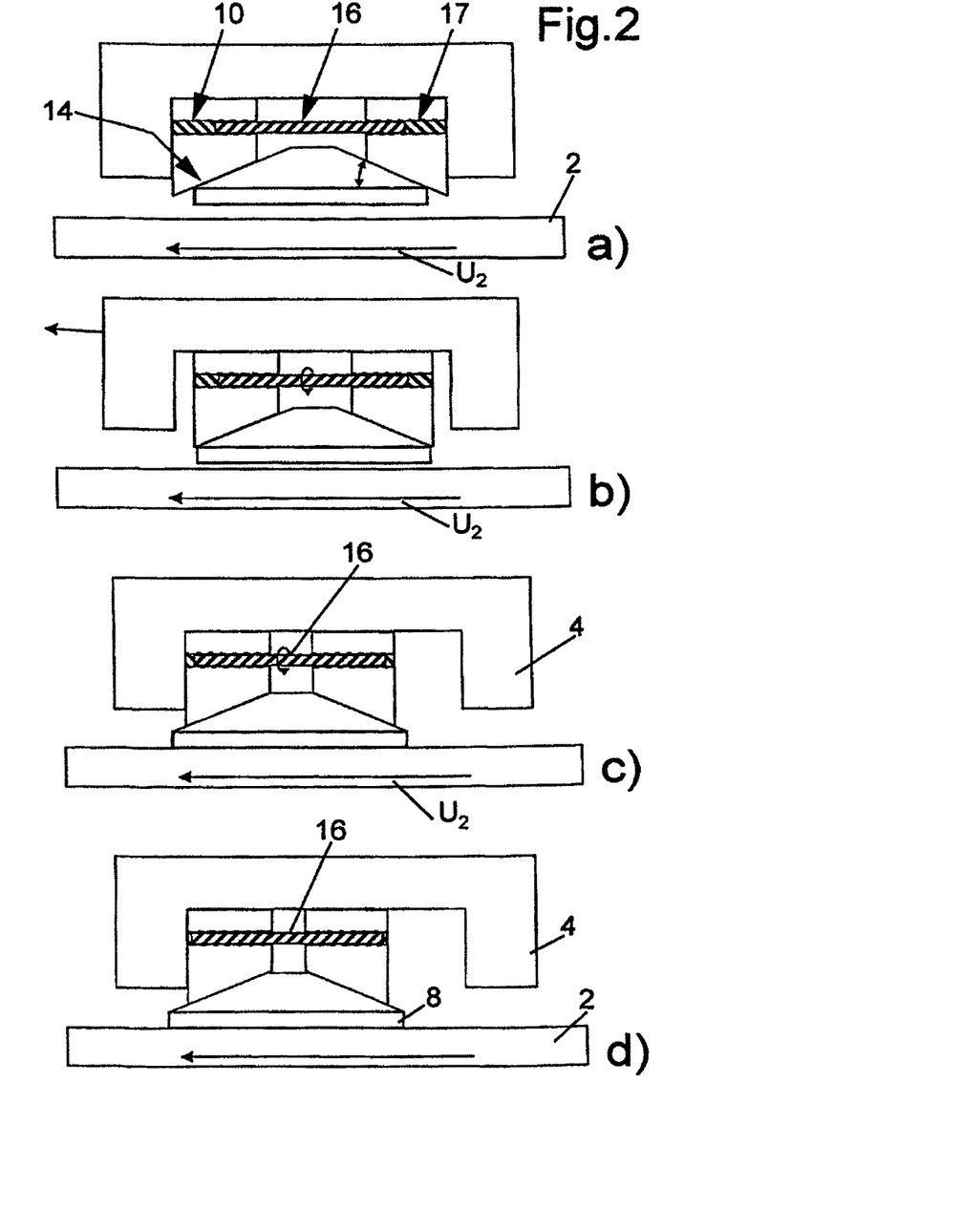
FIGS. 2a-d show a braking action in a film-like sequence, including successive brake operating positions of the brake shown in FIG. 1 during a braking sequence.

FIG. 1 shows the braked state of the exemplary brake described above. The theoretical braking sequence is reproduced in FIGS. 2*a*-*d*. FIG. 2 shows the situation on the application-side brake lining 8.

FIG. 2*a* shows the unbraked position, in which the wedge elements are so far apart that the desired clearance exists between the brake lining 8 and the brake disk 2.

The wedge elements 5, 6 are then moved towards one another—in this exemplary embodiment by electromechanical turning of the spindle 15—which displaces the brake lining unit 7 and its brake lining 8 perpendicular (parallel to the arrow A) to the brake disk 2 turning in the direction of the arrow U (FIG. 2*b*), until the brake lining 8 comes to bear against the brake disk 9 and pushes this against the reaction-side brake lining 10, initiating a braking action in which the brake lining unit 8 is braced in the direction of rotation (peripheral direction U1) on the wedge face 14 of the wedge element 5 situated to the fore in the peripheral direction.

This causes the entire unit having the brake lining unit 8 and the two wedge elements 5, 6 to be displaced in a peripheral direction on the auxiliary frame 4, until the unit comes to bear on the stop face situated to the fore in the peripheral direction—in this case the inner face of the member 11*a* of the U-shaped auxiliary frame 4 (FIG. 2*c*).

The actuator, which acts on the wedge elements 5, 6, is thereby significantly relieved of reaction forces, which are braced against the auxiliary frame 4.

Figure 3:
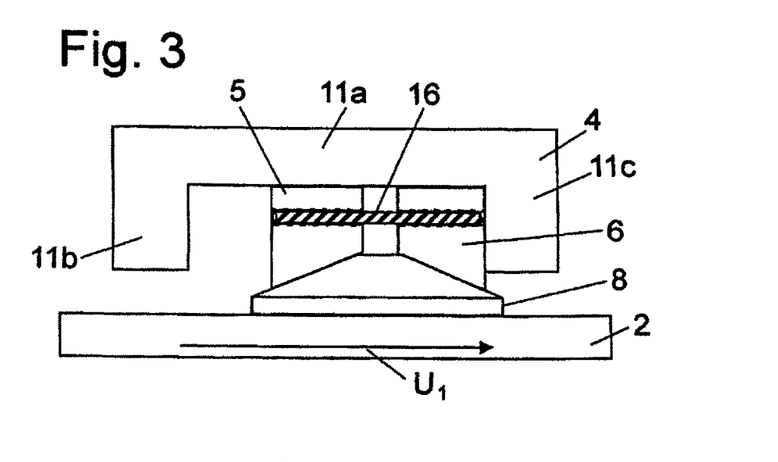
FIG. 3 shows a representation of the arrangement in FIG. 2 after reversal of the direction of rotation.

If the direction of rotation of the brake disk 2 is reversed (for example, when parking on a ferry oscillating due to the motion of the sea), the unit which includes the brake lining and the two wedge elements moves against the opposing stop, now situated in the peripheral direction, in this case the inner face of the member 11*c* of the auxiliary frame 4.

Figure 1B:
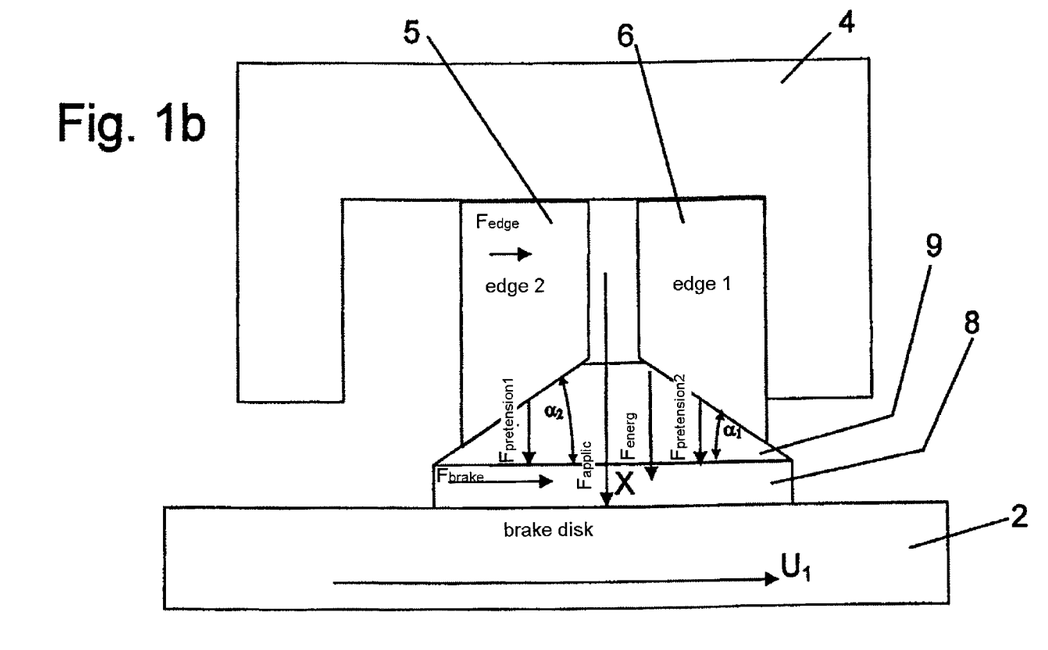
FIG. 1b shows a detail from FIG. 1a showing the forces involved in braking.

The ratio of forces applied during braking are shown in FIG. 1*b*. In this example, the wedge angles on the faces 12, 14 and 13, 15 relative to the brake disk friction surface 2*a* are denoted by $\alpha 1$ and $\alpha 2$.

From the description of this exemplary embodiment, it will be apparent that according to the invention it is not the brake lining alone which is displaced against a wedge, but the wedge elements 5, 6 are also freely moveable against one another inside a cage or auxiliary frame 4 fixed to the brake caliper, which elements then press the brake lining unit 7 against the brake disk 2 (FIG. 2*a*, FIG. 2*b*).

Once the lining 8 has been brought to bear against the brake disk 2, the brake lining 8 and the two wedge elements 5, 6 are carried by the brake disk 2, until the wedge located in the direction of rotation of the disk bears against the wall of the cage, fixed to the brake caliper, situated in the direction of rotation. The braking force $F_{brake}$ and the component $F_{energ}$ of the application force resulting from self-energizing are now dissipated into the caliper, without placing any stress on the actuator.

The braking force $F_{brake}$ is then obtained (calculated without internal friction within the mechanism) as:

$$F_{brake} = F_{applic} \cdot \mu$$

$\mu$ = coefficient of friction between lining and disk $$F_{brake} = (F_{applic1} + F_{applic2} + F_{energ}) \cdot \mu$$

where $$F_{applic1} = F_{wedge}/\tan \alpha 1$$

$$F_{applic2} = F_{wedge}/\tan \alpha 2$$

$$F_{energ} = F_{brake}/\tan \alpha 2$$

giving $$F_{brake} = (F_{wedge}/\tan \alpha 1 + F_{wedge}/\tan \alpha 2 + F_{brake}/\tan \alpha 2) \cdot \mu$$

$$F_{brake} \cdot (\tan \alpha 2 - \mu)/\tan \alpha 2 = F_{wedge} \cdot \mu/\tan \alpha 1 + F_{wedge} \cdot \mu/\tan \alpha 2$$

$$F_{brake} = \mu \cdot (F_{wedge}/\tan \alpha 1 + F_{wedge}/\tan \alpha 2) \cdot \tan \alpha 2/(\tan \alpha 2 - \mu)$$

$$F_{brake} = \frac{\mu \cdot (F_{wedge} \cdot (\tan \alpha 2 / \tan \alpha 1 + 1))}{(\tan \alpha 2 - \mu)}$$

In the opposite direction of travel the indices must be reversed. By selecting different wedge angles for the forward and reverse travel (angles $\alpha 1$, $\alpha 2$) it is possible to set the self-energization differently for the directions of travel. Assuming the same wedge angles $\alpha 1 = \alpha 2 = \alpha$ for forward and reverse travel, this gives $$F_{brake} = \frac{2\mu F_{wedge}}{(\tan \alpha - \mu)} \quad (2)$$

From (1) and (2), given a wedge angle of $\alpha$ or $\alpha 2 = \arctan \mu$ a discontinuity will be observed, where $F_{brake}$ no longer varies as a function of $F_{wedge}$.

At smaller angles the sign is reversed between $F_{brake}$ and $F_{wedge}$, which implies that drag would be bound to occur, which would no longer be possible in the present arrangement. For this reason:

$\alpha, \alpha 1, \alpha 2$ must be > $\arctan \mu$

Figure 4:
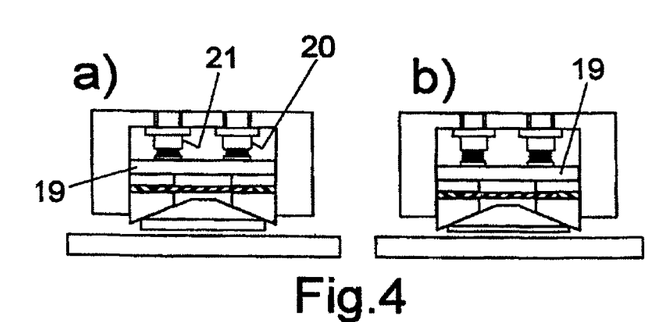
FIG. 4a-b show a part of a disk brake shown in FIG. 1 with an adjustment mechanism.
Figure 5:
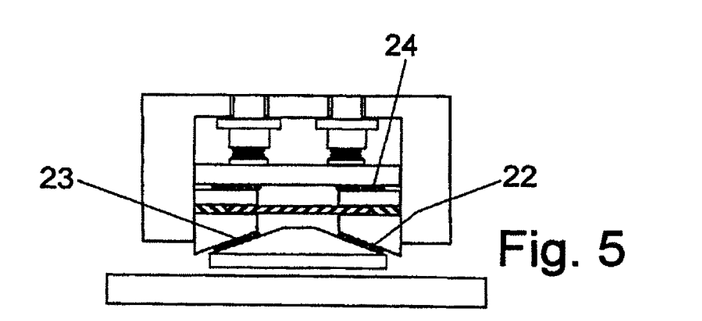
FIG. 5 shows a part of a variant of the disk brake in FIG. 4.
Figures 6, 7:
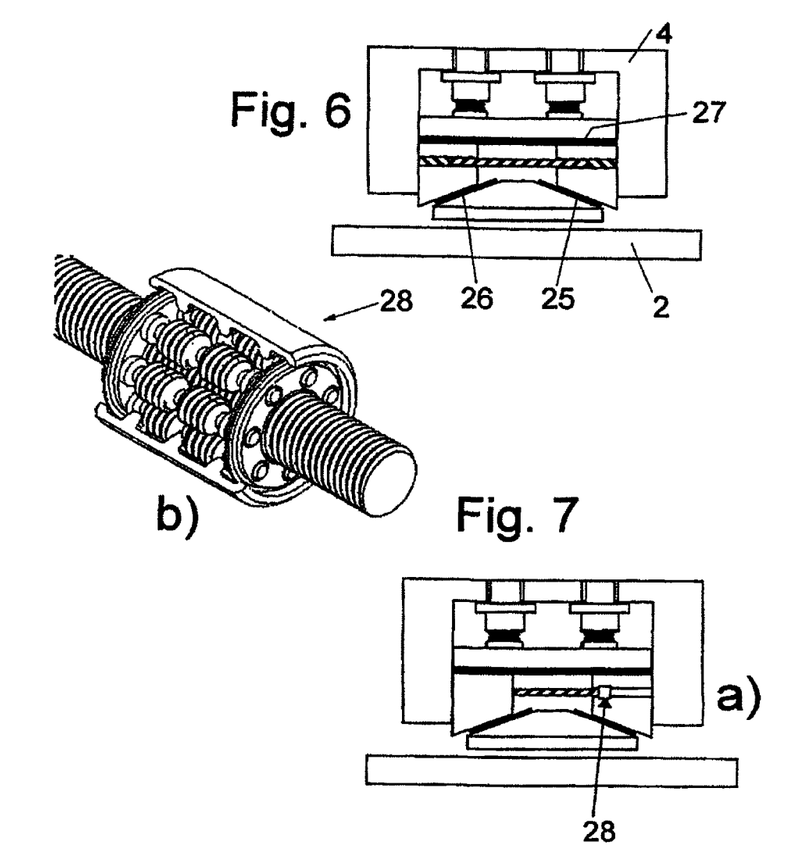
FIGS. 6-15 show further embodiments of self-energizing disk brakes in developments according to the invention.

FIG. 4 shows a different exemplary embodiment in which an adjustment plate 19 is arranged in the auxiliary frame parallel to the brake disk axis of rotation, so that it is moveable relative to the base member 11*a* of the auxiliary frame 4, in order to compensate for the brake lining wear. This can be done by using one or more adjustment pistons 20, 21, which may be of axially variable length and consist, for example, of a spindle/nut combination held in the auxiliary caliper 4 and on the adjustment plate 19, together with an electric motor drive (the latter not being shown here). The wedge elements are here guided so that they are moveable in a peripheral direction on the adjustment plate. The increase in length to compensate for brake lining wear is clearly shown by comparing FIGS. 4a) and 4b). FIGS. 5 and 6 show. Other exemplary embodiments in which bearing devices, in particular roller bearings 22, 23, 24 (FIG. 5) or slide bearings 25, 26, 27 (FIG. 6) can be arranged between the wedge faces 12, 13 and 14, 15 and between the adjustment plate 19 or the base member 11a and the wedge elements.

Figure 8:
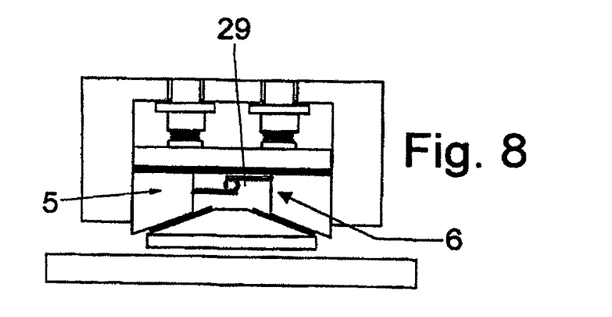
Figure 9:
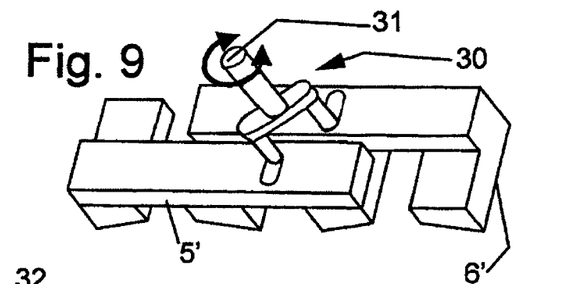
Figure 10:
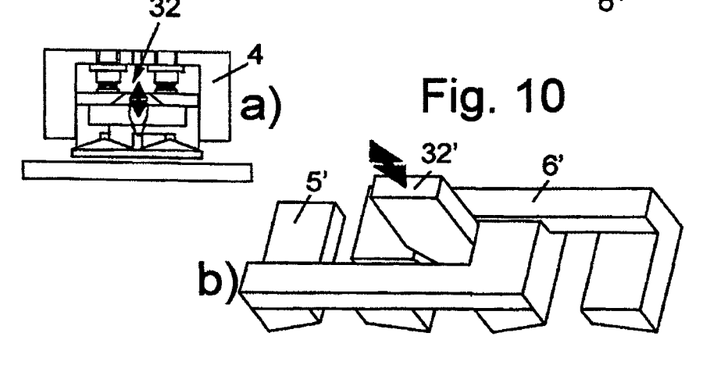
Figure 11:
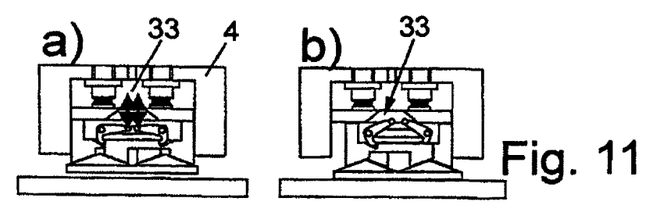

The wedge elements 5, 6 can intrinsically be moved relative to one another by any transmission arrangements or force-transmitting components, which may be driven by an electric motor. Feasible exemplary transmission arrangements include:
  a) Spindles 15, which may also take the form of recirculating ball screws (FIGS. 2-6),
  b) Planetary rolling contact mechanism 28 (FIGS. 7a, 7b),
  c) A toothed rack arrangement 29 as drive between the wedge elements 5, 6 (FIG. 8),
  d) A bracing arrangement 30 with eccentrics 31 (FIG. 9), which between intermeshing double-wedge elements 5', 6', for example, act on a pressure plate 8' with corresponding double-wedge arrangement 34;
  e) A bracing arrangement 32 with expansion wedges 32' (FIGS. 10a, 10b), which between intermeshing double-wedge elements 5', 6', for example, act on a pressure plate 8' with corresponding double-wedge arrangement 34;
  f) A lever arrangement 33, for example with a pair of levers (FIGS. 11a, 11b), which between intermeshing double-wedge elements 5', 6', for example, act on a pressure plate 8' with corresponding double-wedge arrangement 34.

Figure 12:
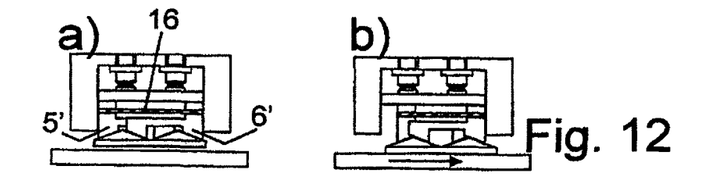

The arrangement with more than one pair of wedges per direction of rotation is also represented by reference to the example of a pair of double wedges depicted in FIG. 12, which shows intermeshing double wedge elements 5' 6' on the pressure plate 8' with corresponding double wedge arrangement 34.

Figure 13:
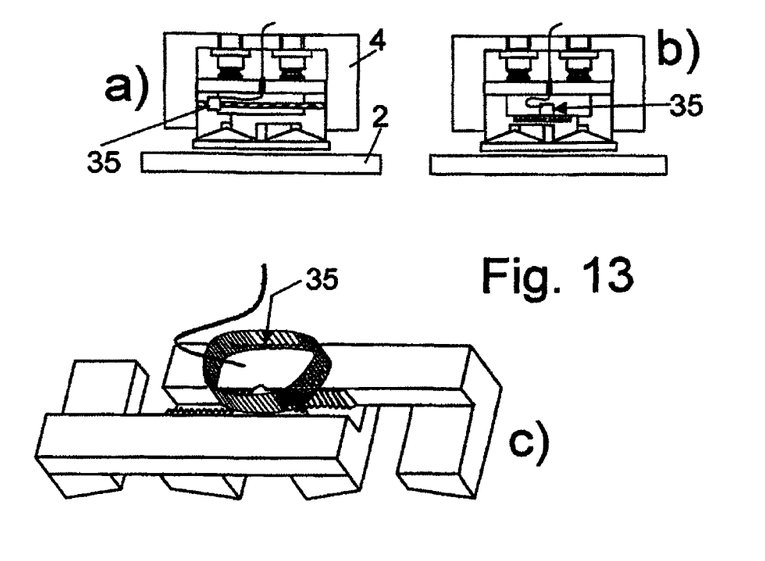
Figure 14:
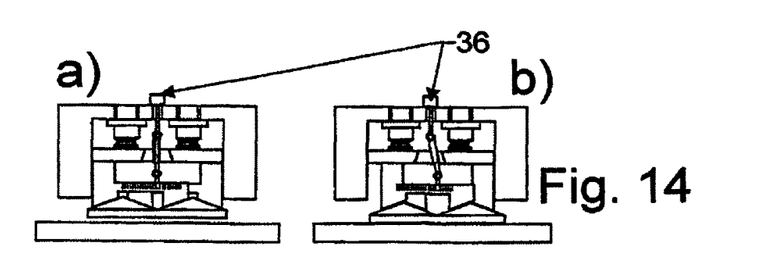

The double wedge elements 5', 6' can be moved relative to one another by for example, using a spindle 15' with an electric motor 35 (FIGS. 13a, 13b, 13c), which according to FIG. 13 can be mounted in the auxiliary frame. Also feasible is a transmission connection through an opening in the auxiliary frame 4 to the area outside the auxiliary frame 4 or even outside the entire brake frame or caliper 3 (shown in FIG. 14, which discloses a toothed rack arrangement 35 and an external electric motor 36). An electronic control unit may also be mounted on the brake caliper 3.

Figure 15:
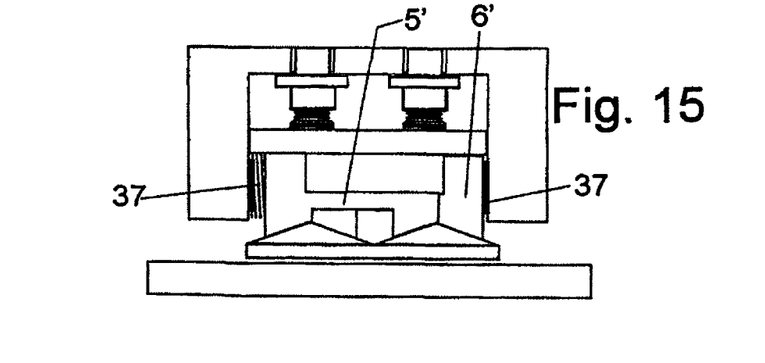

In the event of a rapid change in the direction of rotation, for example at the instant when the brake lining is in contact with the brake disk 2, the entire inner construction is impelled against the wall now situated in the direction of travel—the stop on the member 11b, 11c. In order to prevent damage and excessive stresses, damping elements 37 may be fitted to the members 11b, 11c, for example between the wedge elements 5, 6 and the stops (FIG. 15).

Figure 16:
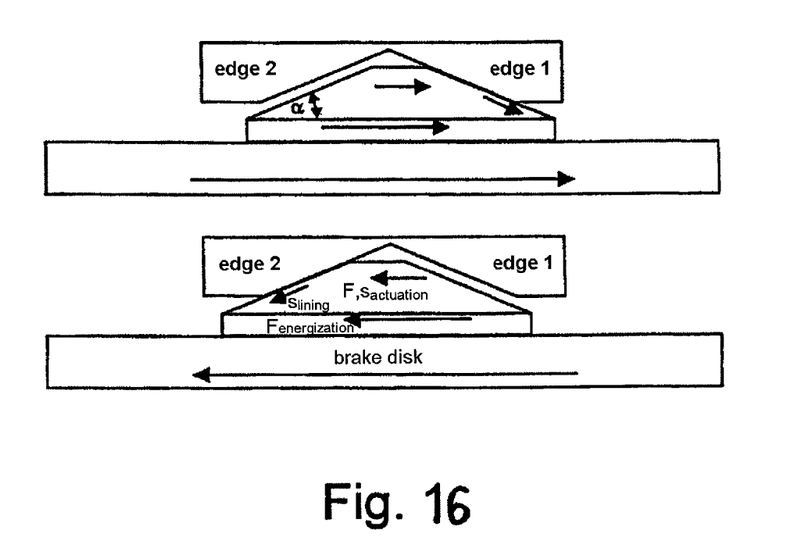
FIG. 16 Shows schematic representations of two known disk brakes of self-energizing type.

FIG. 16 shows the state of the art, in which wedge elements 5, 6 are braced against corresponding wedge elements 5, 6 directly on the brake caliper 3.

The following reference numerals are provided to simplify understanding of the specification and drawings.
Brake disk axis of rotation X
Peripheral direction U1, U2
Disk brake 1
Brake disk 2
Brake frame 3
Auxiliary frame 4
Wedge elements 5,6
Brake disk friction surface 2a
Brake lining unit 7
Brake lining 8
Pressure plate 9
Brake lining 10
Base member 11a
Longitudinal members 11b, 11c
Wedge faces 12, 13
Wedge faces 15, 15
Spindle 16
Holes 17, 18
Adjustment plate 19
Adjustment piston 20, 21
Roller bearings 22, 23, 24
Slide bearings 25, 26, 27
Planetary rolling contact mechanism 28
Toothed rack arrangement 29
Bracing arrangement 30
Eccentric 31
Bracing arrangement 32
Expansion wedges 32'
Lever arrangement 33
Double-wedge arrangement 34
Electric motor 35
Electric motor 36
Damping elements 37

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A part-lining disk brake, comprising:
an electromechanical actuator;
a self-energizing application device having a wedge arrangement designed to press a brake lining against a disk brake; and
at least two wedge elements of the wedge arrangement moveable relative to one another, arranged on one of a brake caliper frame and an auxiliary frame, for applying the brake lining, the at least two wedge elements acting on the brake lining via a trapezoidal pressure plate;
wherein the at least two wedge elements are in contact with the trapezoidal pressure plate; and
wherein the wedge elements are operatively configured to displace the trapezoidal pressure plate toward the disk brake when the wedge elements move toward each other in a direction parallel to the disk brake.

2. The part-lining disk brake as claimed in claim 1, wherein the trapezoidal pressure plate of the brake lining unit, in a top view of the disk brake, has a cross section in the shape of one of a scalene trapezium and an isosceles trapezoid.

3. The part-lining disk brake as claimed in claim 1, wherein a unit comprising the wedge elements and the brake lining unit, during braking sequences, is movable together on one of the brake caliper and the auxiliary frame parallel to the brake disk friction surface against stops.

4. The part-lining disk brake as claimed in claim 1, wherein the auxiliary frame has a U-shape and is provided with a base member bounded at both ends by longitudinal members which extend from the base member in the direction of the brake disk, and which serve as stops for the wedge elements in their movements in a peripheral direction relative to the direction of rotation of the brake disk.

5. The part-lining disk brake as claimed in claim 1, wherein the pressure plate has a side remote from the brake disk of trapezoidal shape, with two wedge faces inclined towards one another, which bear against the wedge faces of the wedge elements, likewise inclined towards one another.

6. The part-lining disk brake as claimed in claim 1, wherein mobility of the wedge elements relative to one another is achieved by an electric motor acting on an arrangement of transmission elements.

7. The part-lining disk brake as claimed in claim 6, wherein the arrangement of transmission elements comprises an electric motor-driven spindle, which in one direction of rotation moves the wedge elements towards one another, and in another direction of rotation moves the wedge elements away from one another.

8. The part-lining disk brake as claimed in claim 7, wherein the spindle is a recirculating ball screw.

9. The part-lining disk brake as claimed in claim 6, wherein the arrangement of transmission elements comprises a threaded spindle.

10. The part-lining disk brake as claimed in claim 6, wherein the arrangement of transmission elements comprises at least one of the following elements:
   a. a spindle,
   b. a planetary rolling contact mechanism,
   c. a toothed rack arrangement forming a drive between the wedge elements,
   d. a bracing arrangement with eccentrics,
   e. a bracing arrangement with expansion wedges, and
   f. a lever arrangement.

11. The part-lining disk brake as claimed in claim 1, wherein the wedge elements each have more than one wedge face.

12. The part-lining disk brake as claimed in claim 1, wherein the wedge elements comprise a pair of double wedges with intermeshing double wedge elements, which bear against a pressure plate with corresponding double wedge arrangement.

13. The part-lining disk brake as claimed in claim 6, wherein the electric motor is mounted on the auxiliary frame.

14. The part-lining disk brake as claimed in claim 6, wherein the electric motor is mounted on an outside face of the brake caliper and is connected to the wedge elements via a transmission connection.

15. The part-lining disk brake as claimed claim 14, wherein the transmission connection has a toothed rack arrangement.

16. The part-lining disk brake as claimed in claim 1, further comprising an electronic control unit arranged on the brake caliper.

17. The part-lining disk brake as claimed in claim 4, further comprising damping elements fitted between the wedge elements and the stops on the longitudinal members.

18. The part-lining disk brake as claimed in claim 1, wherein the wedge elements are displaceable relative to the brake caliper in a direction parallel to the brake disk axis of rotation, to compensate for brake lining wear.

19. The part-lining disk brake as claimed in claim 1, wherein the wedge elements are moveably arranged on an adjustment plate, arranged on one of the auxiliary frame and the brake caliper, to move parallel to the brake disk axis of rotation.

20. The part-lining disk brake as claimed in claim 19, further comprising adjustment pistons of axially variable length arranged between one of the brake caliper and the auxiliary frame, and the adjustment plate.

21. The part-lining disk brake as claimed in claim 19, further comprising bearing devices disposed between the wedge faces and between one of the adjustment plate and a base member and the wedge elements.

22. The part-lining disk brake as claimed in claim 19, wherein the bearing devices comprise one of roller bearings and slide bearings.

\* \* \* \* \*